United States Patent [19]
Katsuma

[11] Patent Number: 5,600,493
[45] Date of Patent: Feb. 4, 1997

[54] FINITE CONJUGATE LENS SYSTEM

[75] Inventor: Toshiaki Katsuma, Saitama-ken, Japan

[73] Assignee: Fuji Photo Optical Co., Ltd., Saitama-ken, Japan

[21] Appl. No.: 365,117

[22] Filed: Dec. 28, 1994

[51] Int. Cl.$^6$ .................................................. G02B 3/02
[52] U.S. Cl. .......................................... 359/717; 359/793
[58] Field of Search .................................. 359/713, 714, 359/715, 716, 717, 793, 794

[56] References Cited

U.S. PATENT DOCUMENTS

| | | | |
|---|---|---|---|
| 5,166,830 | 11/1992 | Ishibai et al. | 359/717 |
| 5,237,456 | 8/1993 | Yoshioka | 359/713 |
| 5,386,321 | 1/1995 | Kawamura | 359/714 |
| 5,404,246 | 4/1995 | Kaneko et al. | 359/713 |
| 5,475,536 | 12/1995 | Kikutani | 359/717 |

FOREIGN PATENT DOCUMENTS 1274109 of 1989 Japan.

*Primary Examiner*—Georgia Y. Epps
*Assistant Examiner*—Jordan M. Schwartz
*Attorney, Agent, or Firm*—Sixbey Friedman Leedom & Ferguson; Gerald J. Ferguson, Jr.; Evan R. Smith

[57] ABSTRACT

A reading lens system consists of a first lens element which is a positive meniscus lens convex toward the object side, a stop and a second lens element which is a meniscus lens convex toward the image plane side. The first lens element, the stop and the second lens element are arranged in this order from the object side. Each of the faces of the second lens element is an aspheric surface represented by formula (1), and satisfying formula (2), as follows:

$$Z = c_i y_i^2 / \{1 + (1 - k_i c_i^2 y_i^2)^{1/2}\} + \sum_{j=2}^{5} A_j y_i^{2j} \quad (1)$$

$$0.8 \leq B_3/B_4 \leq 1.2 \quad (2)$$

wherein
$B_3 = 1 - k_3 c_3^2 y'^2_3$,
$B_4 = 1 - k_4 c_4^2 y'^2_4$,
$k_i$=a value which gives the conic constant of an i-th face as numbered from the object side as $k_i - 1$,
$C_i$=the curvature at the vertex of the aspheric plane of an i-th face,
$y_i$=the height above the optical axis of an i-th face,
$y'_3$=the effective radius of the third face,
$y'_4$=the effective radius of the fourth face, and
$A_j$=$2_j$ order aspheric coefficient (j=2~5).

6 Claims, 4 Drawing Sheets

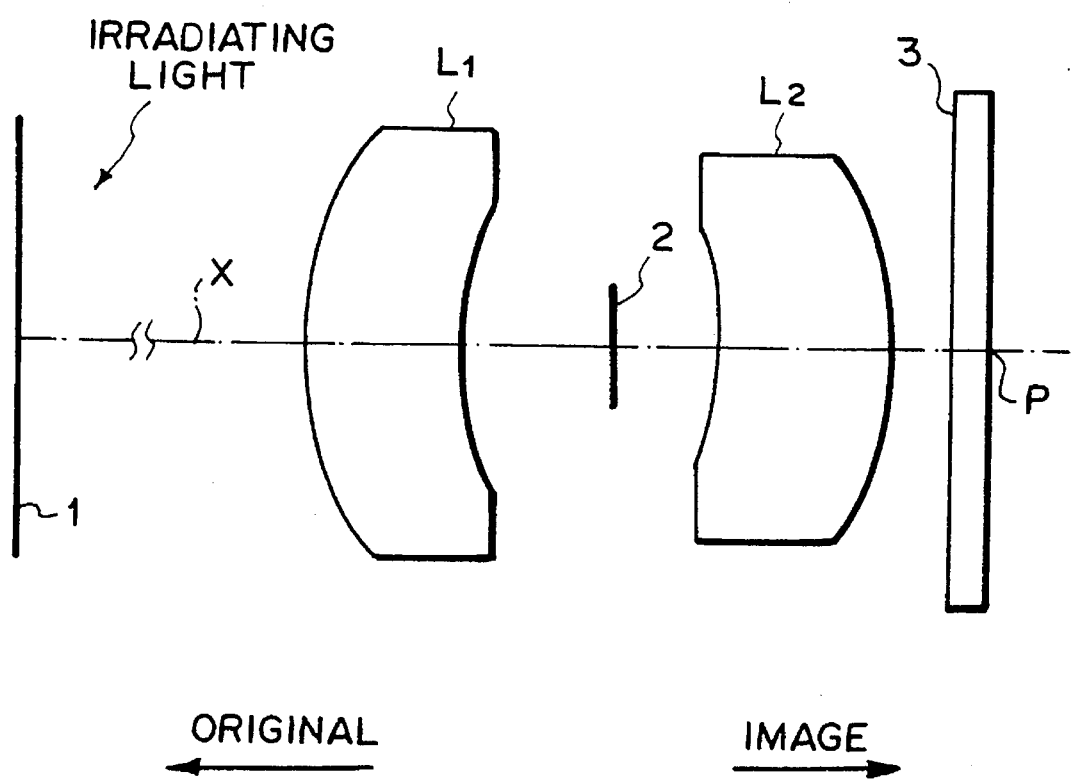

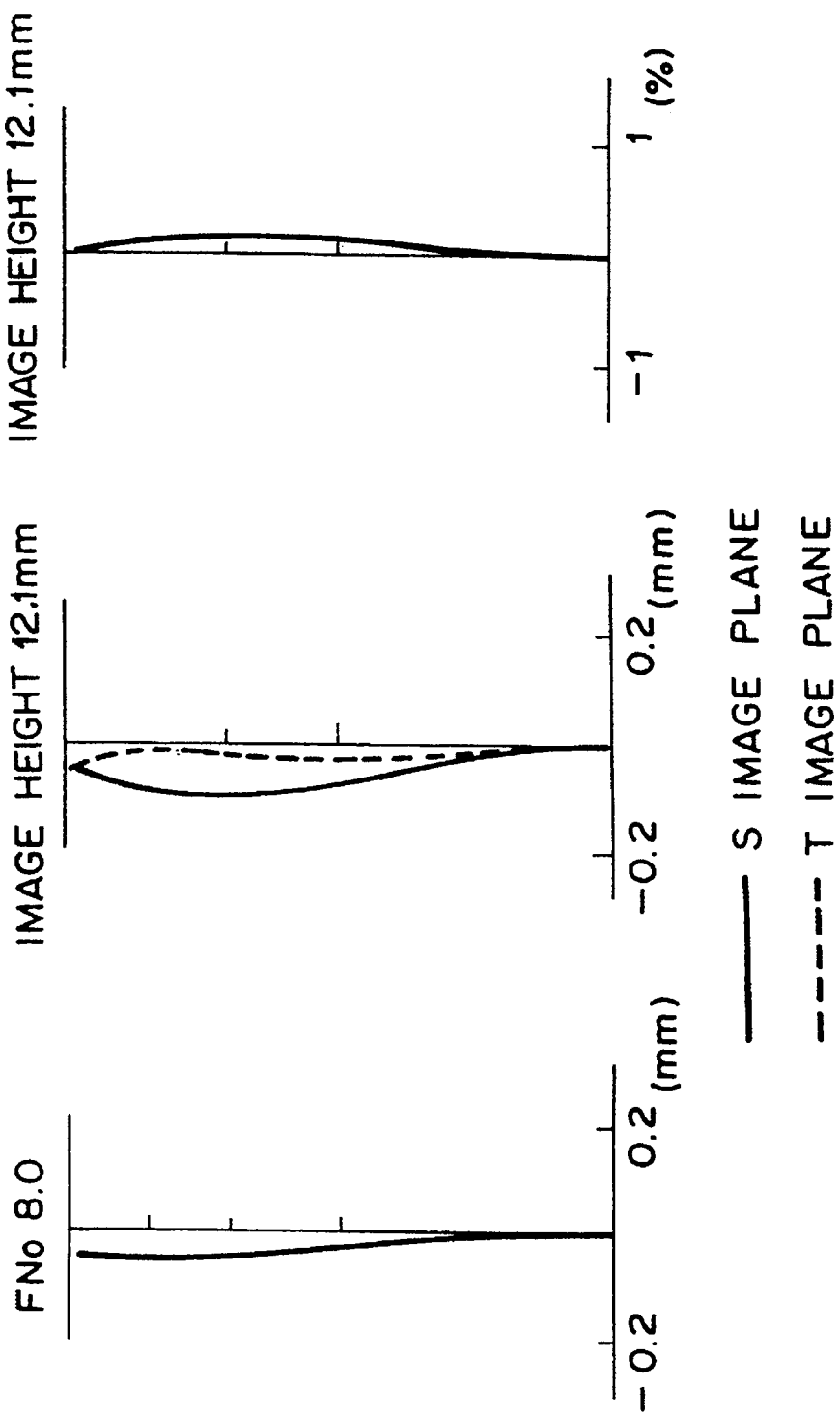

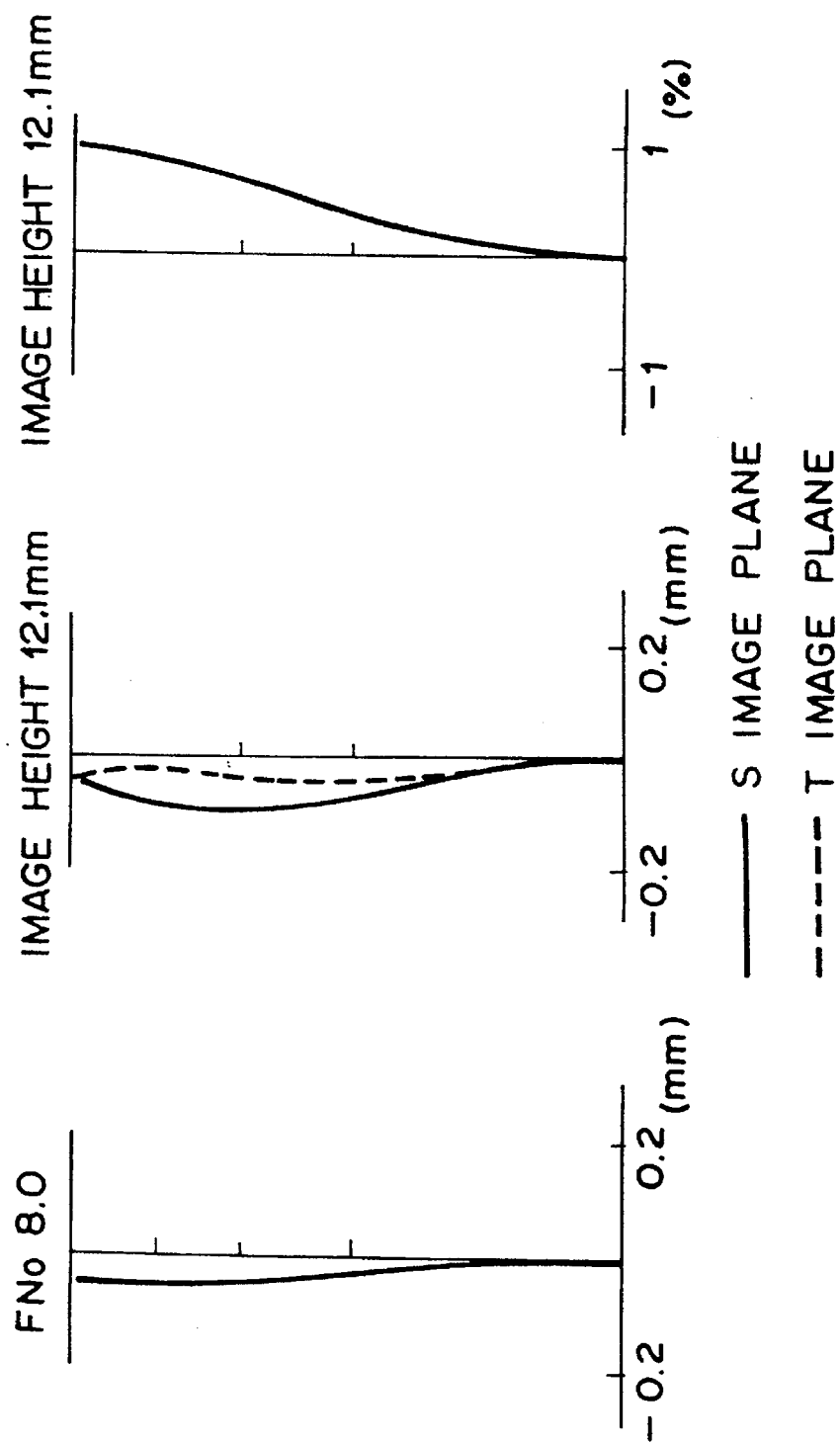

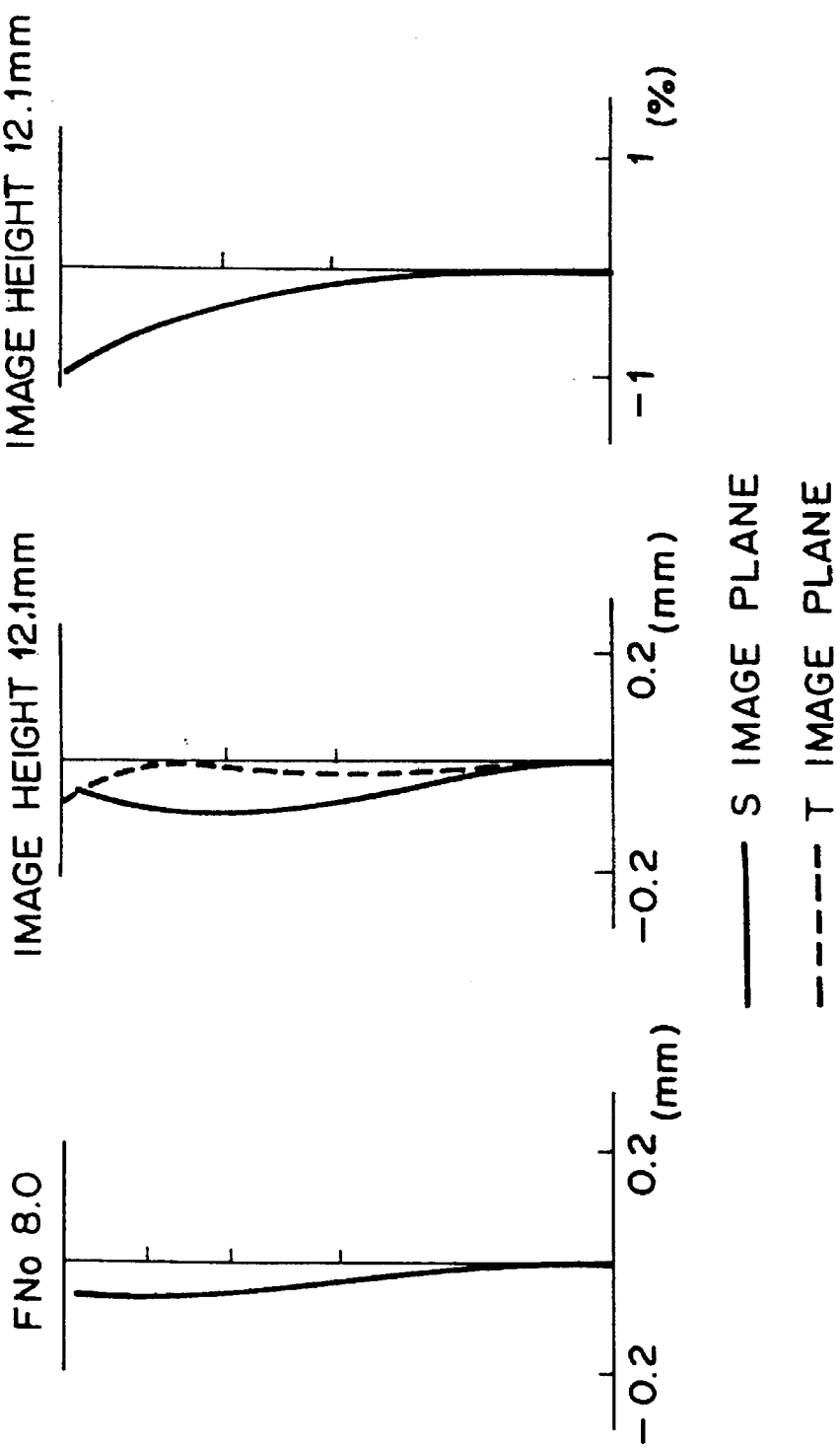

FINITE CONJUGATE LENS SYSTEM

BACKGROUND OF THE INVENTION

1. Field of the Invention

This invention relates to a reading lens system, and more particularly to a reading lens system for projecting information such as figures, characters and the like on an original onto a CCD or a line sensor on an enlarged or reduced scale in facsimiles, raster input scanners or the like.

2. Description of the Prior Art

There have been developed various finite conjugate lens systems for use in optical devices.

There has been a demand for finite conjugate lens systems consisting of two lens elements in order to reduce the size and cost of the overall optical devices. For example, a finite conjugate lens system consisting of two lens elements is disclosed in Japanese Unexamined Patent Publication No. 1(1989)-274109. However the lens system disclosed in the patent publication is large in distortion and a projected image is distorted especially in the peripheral portion thereof. Accordingly, the lens system is difficult to use as a reading lens, for instance, in a facsimile.

SUMMARY OF THE INVENTION

In view of the foregoing observations and description, the primary object of the present invention is to provide a reading lens system which is a two-lens-element finite conjugate lens system having a sufficiently small distortion to use as a reading lens for a facsimile and the like.

The reading lens system of the present invention comprises a first lens element which is a meniscus lens having a positive refractive power and convex toward the object side, a stop and a second lens element which is a meniscus lens convex toward the image plane side, the first lens element, the stop and the second lens element being arranged in this order from the object side, and each of the faces of the second lens element being an aspheric surface represented by formula (1) below. The second lens element also satisfies formula (2) below.

$$Z = c_i y_i^2 / \{1 + (1 - k_i c_i^2 y_i^2)^{1/2}\} + \sum_{j=2}^{5} A_j y_i^{2j} \quad (1)$$

$$0.8 \leq B_3/B_4 \leq 1.2 \quad (2)$$

wherein $B_3 = 1 - k_3 c_3^2 {y'_3}^2$,
$B_4 = 1 - k_4 c_4^2 {y'_4}^2$, $k_i$ = a value which gives the conic constant of an i-th face as numbered from the object side as $k_i - 1$, $c_i$ = the curvature at the vertex of the aspheric plane of an i-th face as numbered from the object side, $y_i$ = the height above the optical axis of an i-th face as numbered from the object side, $y'_3$ = the effective radius of the third face as numbered from the object side, $y'_4$ = the effective radius of the fourth face as numbered from the object side, and $A_j$ = 2j order aspheric coefficient (j=2~5).

In one preferred embodiment, the second lens element is made of plastic and the following formula (3) is satisfied $$|f1/f2| \leq 0.18 \quad (3)$$

wherein f1 and f2 respectively represent the focal lengths of the first and second lens elements.

The reading lens system of the present invention has a substantially symmetrical lens arrangement where the first and second lens elements are positioned on opposite sides of the stop with their convex faces faced outward and at the same time formula (2) is satisfied. Accordingly the reading lens system of the present invention can be very small in distortion.

When $B_3/B_4$ is larger than the upper limit in the formula (2), pin-cushion distortion is enlarged and when $B_3/B_4$ is smaller than the lower limit in the formula (2), barrel distortion is enlarged.

Generally a lens element of plastic is apt to deform with change in temperature to cause focal shift of the overall lens system though it can be easily manufactured at low cost. When formula (3) is satisfied, the refractive power of the second lens element becomes greatly smaller than that of the first lens element and accordingly deformation of the second lens element due to temperature change less affects the focus of the overall lens system.

BRIEF DESCRIPTION OF THE DRAWINGS

FIG. 1 is a schematic cross-sectional view showing the arrangement of the lens elements in reading lens systems in accordance with first to third embodiments of the present invention, FIGS. 2A to 2c respectively show spherical aberration, the astigmatic field curve (curvature of field) and distortion at a focal length of 25 mm of the reading lens system in accordance with the first embodiment of the present invention, FIGS. 3A to 3c respectively show spherical aberration, the astigmatic field curve (curvature of field) and distortion at a focal length of 25 mm of the reading lens system in accordance with the second embodiment of the present invention, and FIGS. 4A to 4c respectively show spherical aberration, the astigmatic field curve (curvature of field) and distortion at a focal length of 25 mm of the reading lens system in accordance with the third embodiment of the present invention.

DESCRIPTION OF THE PREFERRED EMBODIMENTS

As shown in FIG. 1, each of the reading lens systems in accordance with the first to third embodiments of the present invention comprises first and second lens elements $L_1$ and $L_2$ and a stop 2 disposed between the first and second lens elements $L_1$ and $L_2$. A light bundle which carries thereon image information of an original 1 and enters the reading lens system along the optical axis X from the original (object) side is focused on an image plane P of a CCD (not shown) through a protective glass 3.

The first lens element $L_1$ is a positive meniscus lens convex toward the object side and the second lens element $L_2$ is a meniscus lens convex toward the image plane side. The first lens element $L_1$ is made of glass and the second lens element $L_2$ is made of plastic.

The first and second lens elements $L_1$ and $L_2$ satisfy the following formulae (2) to (4).

$$0.8 \leq B_3/B_4 \leq 1.2 \tag{2}$$

wherein $B_3=1-k_3 c_3^2 y'_3{}^2$,
$B_4=1-k_4 c_4^2 y'_4{}^2$,
$k_i$=a value which gives the conic constant of an i-th face as numbered from the object side as $k_i-1$,
$c_i$=the curvature at the vertex of the aspheric plane of an i-th face as numbered from the object side,
$y_i$=the height above the optical axis of an i-th face as numbered from the object side,
$y'_3$=the effective radius of the third face as numbered from the object side,
$y'_4$=the effective radius of the fourth face as numbered from the object side.

$$|f1/f2| \leq 0.18 \tag{3}$$

wherein f1 and f2 respectively represent the focal lengths of the first and second lens elements $L_1$ and $L_2$.

$$|(p_1/p_2)-1| \leq 3.5 \tag{4}$$

wherein $p_1=(1/r_1-1/r_2)f/n_1$
$p_2=(1/r_3-1/r_4)f/n_2$
$r_i$=the radious of cruvature of an i-th face as numbered from the object side,
f=the focal length of the overall lens system,
$n_1$=the refractive index for a reference wavelength (e-line) of of the first lens element $L_1$,
$n_2$=the refractive index for the reference wavelength (e-line) of of the second lens element $L_2$. When formula (2) is satisfied, the distortion of the lens system can be suppressed. When formula (3) is satisfied, the refractive power of the second lens element $L_2$ which is of plastic becomes small, whereby focal shift of the overall lens system due to temperature can be suppressed. When formula (4) is satisfied, astigmatic field curve and astigmatism can be suppressed. When the astigmatic field curve is small, the reading lens system can provide an image or high quality when used in a facsimile of the like.

The radii of curvature r(mm) of the refracting surfaces, the axial surface separations d (mm) (the central thicknesses of the lenses or the air separations), the refractive indexes n for the e-line of the reading lens systems in accordance with the first to third embodiments are as shown in tables 1 to 3, respectively. In the tables, the radii of curvature of the refracting surfaces, the axial surface separations, the refractive indexes for the e-line are designated in order from the object side at $r_1$ to $r_6$, $d_1$ to $d_4$, and $n_1$ to $n_5$.

In the tables, ★ denotes that the surface is an aspheric surface and the shape of the aspheric surface is defined by the following formula.

$$Z = c_i y_i^2/\{1 + (1 - k_i c_i^2 y_i^2)^{1/2}\} + \sum_{j=2}^{5} A_j y_i^{2j} \tag{1}$$

wherein

Z=the length of a perpendicular line between a point on an aspheric plane at a height of y; above the optical axis and a plane tangent to the aspheric plane at the vertex of the aspheric plane,
$k_i$=the conic constant of an i-th face as numbered from the object side,
$c_i$=the curvature at the vertex of the aspheric plane of an i-th face as numbered from the object side ($c_i=1/r_i$),
$y_i$=the height above the optical axis of an i-th face as numbered from the object side, and
$A_j$=2j order aspheric coefficient (j=2~5).

First embodiment

TABLE 1

| radius of curvature r | axial surface separation d | refracting index n |
|---|---|---|
| $r_1$ = 0.24344 | $d_1$ = 0.11880 | $n_1$ = 1.80645 |
| $r_2$ = 0.28531 | $d_2$ = 0.17520 | $n_2$ = 1.00000 |
| $r_3$ = −0.26287★ | $d_3$ = 0.112 | $n_3$ = 1.49953 |
| $r_4$ = −0.28967★ | | $n_4$ = 1.0 |
| $r_5$ = ∞ | $d_4$ = 0.02800 | $n_5$ = 1.51825 |
| $r_6$ = ∞ | | |

The aspheric coefficients of the third and fourth faces are as follows.

| | third face | fourth face |
|---|---|---|
| $A_2$ | −2.093197618 × 10 | −1.058502925 × 10 |
| $A_3$ | −1.153022439 × 10² | −1.282518274 × 10² |
| $A_4$ | −6.086014780 × 10³ | −9.575521918 × 10³ |
| $A_5$ | −1.701132267 × 10⁴ | −6.604802402 × 10⁴ |
| k | 4.318857135 | 2.007500952 |

The effective radii of the third and fourth faces are as follows.

| third face | 0.07972 |
|---|---|
| fourth face | 0.13016 |

The focal length f of the overall lens system is 0.99930. The values of $B_3/B_4$, |f1/f2| and |$p_1/p_2$)−1| are 1.01365, 0.06256 and 2.42202, respectively, and formulae (2), (3) and (4) are satisfied. The F-number and the magnification of the overall lens system are 8.0 and −0.112, respectively.

Second embodiment

TABLE 2

| radius of curvature r | axial surface separation d | refracting index n |
|---|---|---|
| $r_1$ = 0.24918 | $d_1$ = 0.12596 | $n_1$ = 1.80645 |
| $r_2$ = 0.29690 | $d_2$ = 0.17473 | $n_2$ = 1.00000 |
| $r_3$ = −0.25943★ | $d_3$ = 0.10514 | $n_3$ = 1.49953 |
| $r_4$ = −0.29334★ | | $n_4$ = 1.00000 |
| $r_5$ = ∞ | $d_4$ = 0.02800 | $n_5$ = 1.51825 |
| $r_6$ = ∞ | | |

The aspheric coefficients of the third and fourth faces are as follows.

| | third face | fourth face |
|---|---|---|
| $A_2$ | −2.093197618 × 10 | −1.058502925 × 10 |
| $A_3$ | −1.153022439 × 10² | −1.282518274 × 10² |
| $A_4$ | −6.086014780 × 10³ | −9.575521918 × 10³ |
| $A_5$ | −1.701132267 × 10⁴ | −6.604802402 × 10⁴ |
| k | 4.122090672 | 2.146958552 |

The effective radii of the third and fourth faces are as follows.

| third face | 0.07864 |
|---|---|
| fourth face | 0.12692 |

The focal length f of the overall lens system is 0.99790. The values of $B_3/B_4$, |f1/f2| and |($p_1/p_2$)−1| are 1.03873, 0.00645 and 2.20163, respectively, and formulae (2), (3) and (4) are satisfied. The F-number and the magnification of the overall lens system are 8.0 and −0.112, respectively.

Third embodiment

TABLE 3

| radius of curvature r | axial surface separation d | refracting index n |
| --- | --- | --- |
| $r_1 = 0.23550$ | $d_1 = 0.10977$ | $n_1 = 1.80645$ |
| $r_2 = 0.27099$ | $d_2 = 0.17534$ | $n_2 = 1.00000$ |
| $r_3 = -0.26503$★ | $d_3 = 0.11915$ | $n_3 = 1.49953$ |
| $r_4 = -0.28462$★ | | $n_4 = 1.00000$ |
| $r_5 = \infty$ | $d_4 = 0.02800$ | $n_5 = 1.51825$ |
| $r_6 = \infty$ | | |

The aspheric coefficients of the third and fourth faces are as follows.

| | third face | fourth face |
| --- | --- | --- |
| $A_2$ | $-2.093197618 \times 10$ | $-1.058502925 \times 10$ |
| $A_3$ | $-1.153022439 \times 10^2$ | $-1.282518274 \times 10^2$ |
| $A_4$ | $-6.086014780 \times 10^3$ | $-9.575521918 \times 10^3$ |
| $A_5$ | $-1.701132267 \times 10^4$ | $-6.604802402 \times 10^4$ |
| k | 4.485403013 | 1.85245171 |

The effective radii of the third and fourth faces are as follows.

| third face | 0.07944 |
| --- | --- |
| fourth face | 0.13200 |

The focal length f of the overall lens system is 1.00075. The values of $B_3/B_4$, $|f1/f2|$ and $|(p_1/p_2)-1|$ are 0.99242, 0.12466 and 2.77698, respectively, and formulae (2), (3) and (4) are satisfied. The F-number and the magnification of the overall lens system are 8.0 and −0.112, respectively.

FIGS. 2A to 2C, FIGS. 3A to 3C and FIGS. 4A to 4C respectively show various aberrations of the reading lens systems of the first to third embodiments.

As can be understood from FIGS. 2A to 2C, FIGS. 3A to 3C and FIGS. 4A to 4C, the reading lens system of each embodiment is excellent in aberrations. Especially the distortion is not larger than 1% and accordingly the reading lens system of the present invention is especially suitable for a facsimile.

The arrangement of the reading lens system in accordance with the present invention need not be limited to those described above in conjunction with the first to third embodiments, but the radius of curvature of each lens element, the axial surface separations (including the thickness of the lens elements) and the like may be variously modified without departing from the spirit and scope of the invention.

For example, the second lens element $L_2$ may be a meniscus lens having a negative refractive power or may be made of glass.

The reading lens system of the present invention may be used as a reading lens in various devices without limiting to facsimiles.

As can be understood from the description above, being a two-lens-element finite conjugate lens system which is small in aberrations especially in distortion, the reading lens system of the present invention can be small in size, can be manufactured at low cost and can provide a high quality image. Accordingly, the reading lens system of the present invention is especially useful as a reading lens for a facsimile and the like.

What is claimed is:

1. A reading lens system arranged between an object side and an image plane side, comprising a first lens element which is a meniscus lens having a positive refractive power and convex toward the object side, a stop and a second lens element which is a meniscus lens convex toward the image plane side, the first lens element, the stop and the second lens element being arranged in this order from the object side, and each of the faces of the second lens element being an aspheric surface represented by the formula $$Z = c_i y_i^2 / \{1 + (1 - k_i c_i^2 y_i^2)^{1/2}\} + \sum_{j=2}^{5} A_j y_i^{2j};$$

and wherein $$0.8 \leq B_3/B_4 \leq 1.2,$$

where

Z is the length of a perpendicular line between a point on an aspheric plane at a height of $y_i$ above the optical axis and a plane tangent to the aspheric plane at a vertex of the aspheric plane, $B_3 = 1 - k_3 c_3^2 {y'_3}^2$, $B_4 = 1 - k_4 c_4^2 {y'_4}^2$ $k_i$=a value which gives the conic constant of an i-th face as numbered from the object side as $k_i$−1, $c_i$=the curvature at the vertex of the aspheric plane of an i-th face as numbered from the object side, $y_i$=the height above the optical axis of an i-th face as numbered from the object side, $y'_3$=the effective radius of the third face as numbered from the object side, $y'_4$=the effective radius of the fourth face as numbered from the object side, and $A_j$=2j order aspheric coefficient (j=2~5).

2. A reading lens system as defined in claim 1 in which the second lens element is made of plastic and the following formula (3) is satisfied $$|f1/f2| \leq 0.18 \tag{3}$$

wherein f1 and f2 respectively represent the focal length of the first and second lens elements.

3. A reading lens system as defined in claim 1 or 2 in which the following formula (4) is satisfied $$|(p_1/p_2)-1| \leq 3.5 \tag{4}$$

wherein $p_1 = (1/r_1 - 1/r_2)f/n_1$ $p_2 = (1/r_3 - 1/r_4)f/n_2$ $r_i$=the radius of curvature of an i-th face as numbered from the object side, f=the focal length of the overall lens system, $n_1$=he refractive index for e-line of the first lens element $L_1$, and $n_2$=the refractive index for e-line of of the second lens element $L_2$.

4. The reading lens system of claim 1 wherein the first lens element is a glass lens.

5. The reading lens system of claim 1 wherein the focal length of the lens system is approximately 1.0.

6. The reading lens system of claims 1, 2, 4 or 5 wherein the first lens element has two spheric surfaces.

* * * * *